(12) United States Patent
Sabine

(10) Patent No.: US 6,591,543 B2
(45) Date of Patent: Jul. 15, 2003

(54) TOP WATER LURE WITH HIGHLY ACTIVE PROPELLER

(76) Inventor: Kenneth P. Sabine, 44 North St., Windsor Locks, CT (US) 06096

( * ) Notice: Subject to any disclaimer, the term of this patent is extended or adjusted under 35 U.S.C. 154(b) by 0 days.

(21) Appl. No.: 10/010,097

(22) Filed: Nov. 8, 2001

(65) Prior Publication Data

US 2002/0040545 A1 Apr. 11, 2002

Related U.S. Application Data

(63) Continuation-in-part of application No. 09/549,375, filed on Apr. 14, 2000, now abandoned.

(51) Int. Cl.[7] .............................................. A01K 85/10
(52) U.S. Cl. .................... 43/42.11; 43/42.14; 43/42.17; 43/42.19
(58) Field of Search ............................. 43/42.11, 42.13, 43/42.14, 42.15, 42.16, 42.17, 42.19, 42.2, 42.21

(56) References Cited

U.S. PATENT DOCUMENTS

| | | | | |
|---|---|---|---|---|
| 810,017 A | * | 1/1906 | Ackerman | 43/42.14 |
| 832,520 A | * | 10/1906 | Woods | 43/42.14 |
| 1,758,344 A | * | 5/1930 | Wright et al. | 43/42.17 |
| 1,820,887 A | * | 8/1931 | Pflueger | 43/42.17 |
| 2,167,945 A | * | 8/1939 | Gilliam | 43/42.13 |
| 2,307,478 A | * | 1/1943 | Adam | 43/42.17 |
| 2,472,505 A | * | 6/1949 | Yocam et al. | 43/42.13 |
| 2,549,354 A | * | 4/1951 | Wilson | 43/42.17 |
| 2,586,141 A | * | 2/1952 | Angell | 43/42.17 |
| 2,588,300 A | * | 3/1952 | Smith | 43/42.17 |
| 3,045,382 A | * | 7/1962 | Watkins | 43/42.17 |
| 3,344,550 A | * | 10/1967 | Peters | 43/42.11 |
| 3,533,182 A | * | 10/1970 | Turbeville et al. | 43/42.14 |
| 3,680,247 A | * | 8/1972 | McKenzie | 43/42.17 |
| 3,990,171 A | * | 11/1976 | Davis | 43/42.17 |
| 4,135,323 A | * | 1/1979 | Esten | 43/42.14 |
| 5,327,671 A | * | 7/1994 | Rosek | 43/42.17 |
| 6,112,451 A | * | 9/2000 | Webb | 43/42.19 |

* cited by examiner

Primary Examiner—Darren W. Ark
(74) Attorney, Agent, or Firm—M. P. Williams

(57) ABSTRACT

A propeller 33 is disposed on a bearing collar 42 to rotate about a shaft 10 of a lure 32. The propeller has a plurality of blades 36, each having a proximal portion 37 with a first degree of pitch and a distal portion 38 having a second degree of pitch which is different than said first degree of pitch. The blades may have distal ends which have the same direction of pitch as the proximal ends, or distal ends which have pitch opposite to that of the proximal ends. The blades may have straight bends or curved bends between the proximal and distal portions, and each blade may comprise a single, smoothly curvilinear surface. The blades may have one or more holes of various sizes in one or more blades of each propeller, either in the distal portion or the proximal portion of the blades. One or more propellers may be mounted on buzz baits, top water lures including plugs, and on other lures.

18 Claims, 4 Drawing Sheets

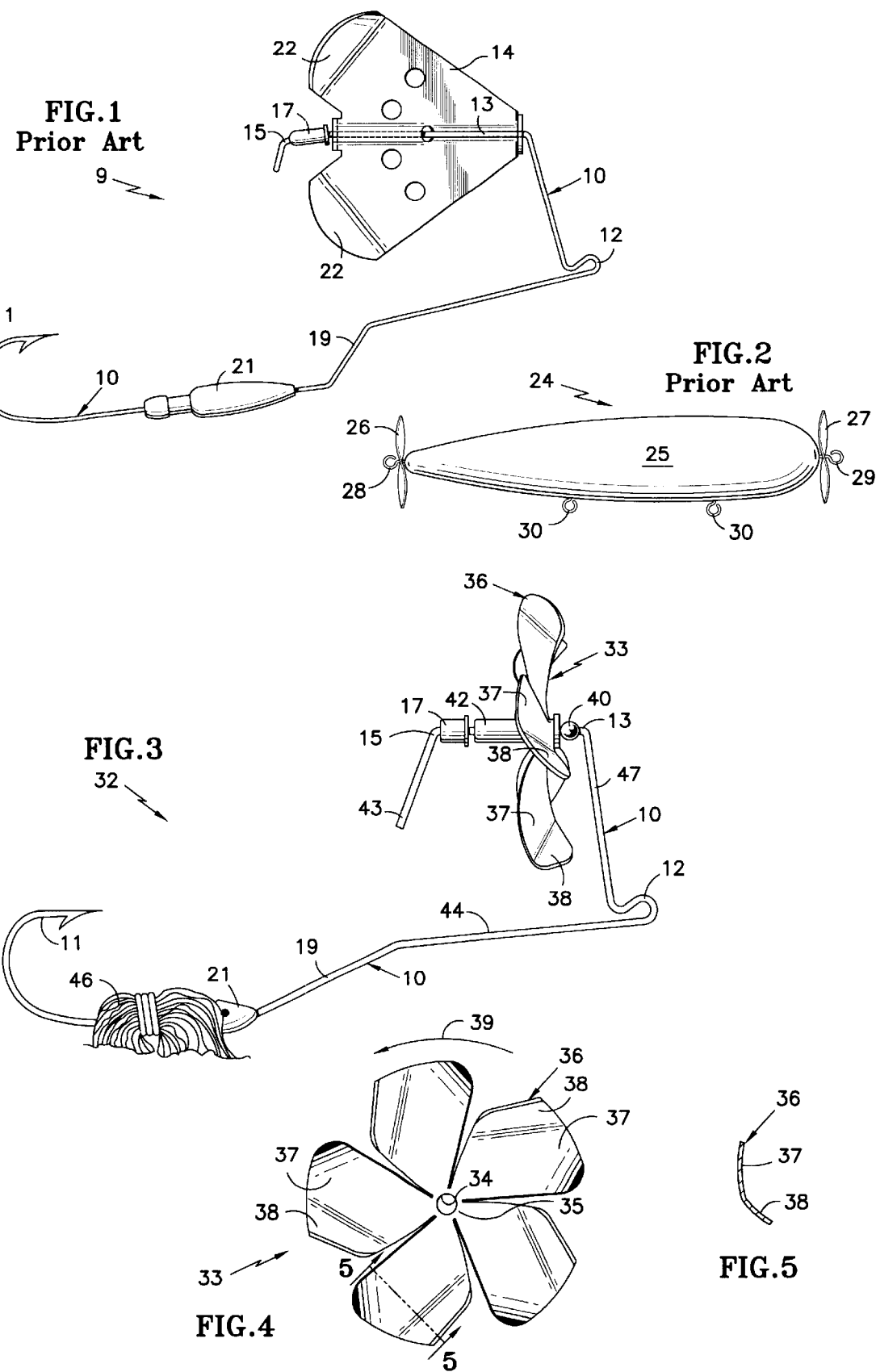

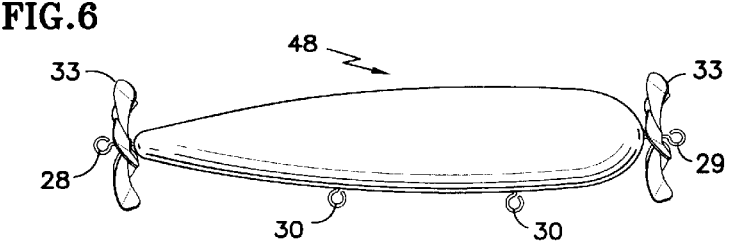
FIG.6
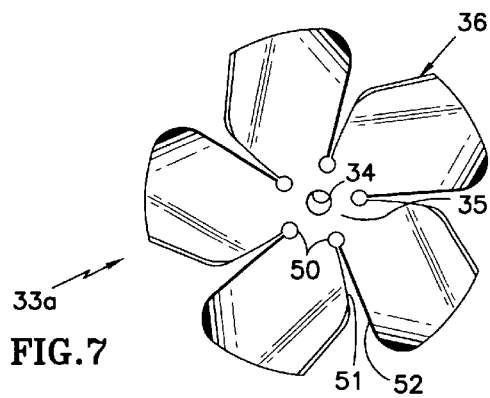
FIG.7
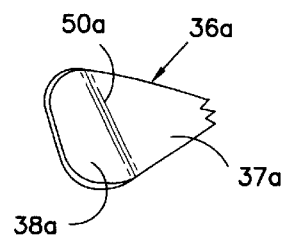
FIG.8
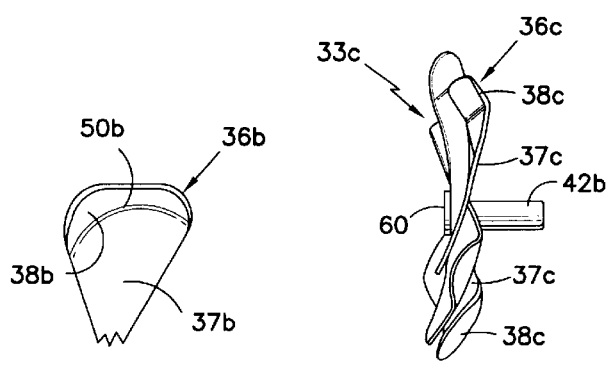
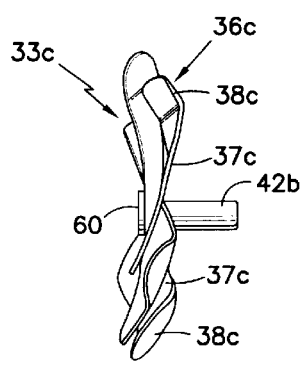
FIG.9　　FIG.10
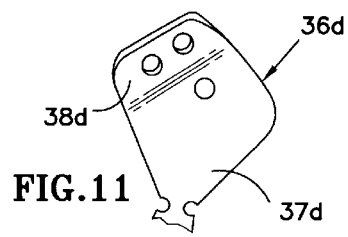
FIG.11
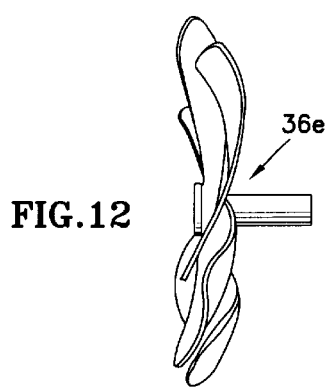
FIG.12
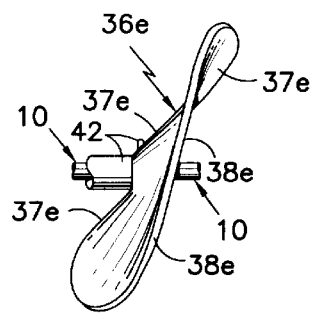
FIG.13

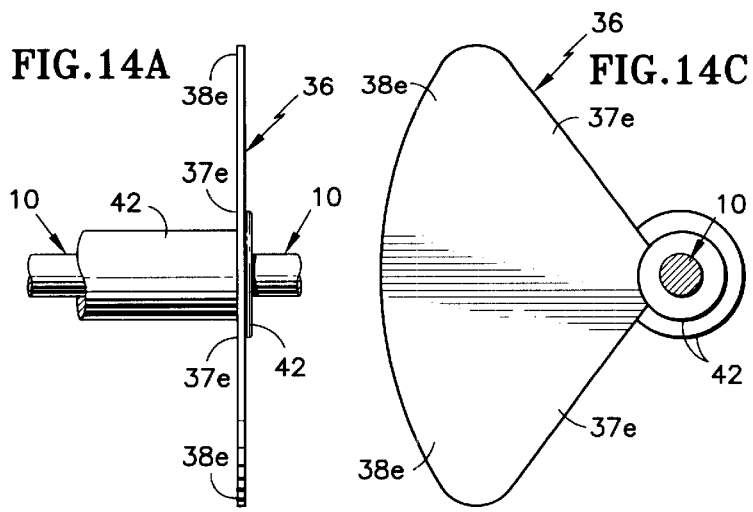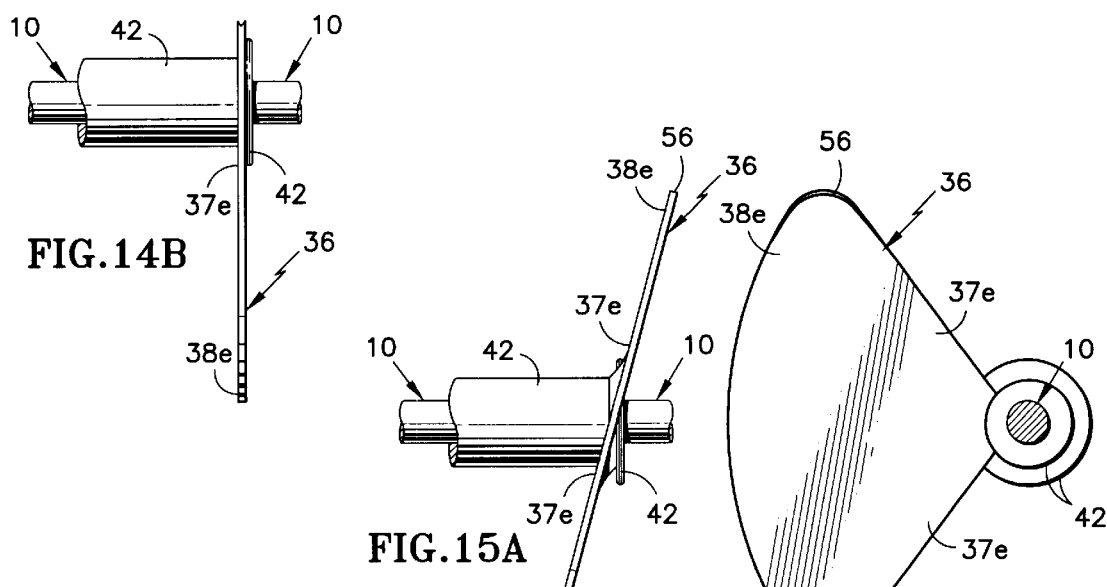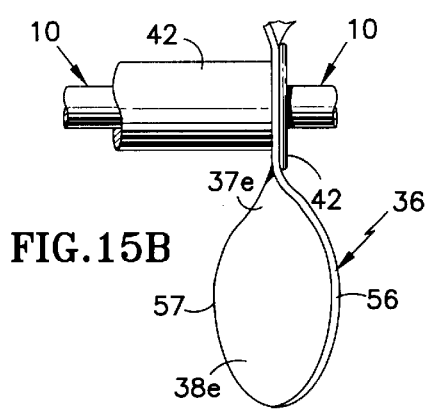

TOP WATER LURE WITH HIGHLY ACTIVE PROPELLER

CROSS REFERENCE TO RELATED APPLICATIONS

This application is a continuation-in-part of U.S. patent application Ser. No. 09/549,375, filed Apr. 14, 2000 now abandoned.

TECHNICAL FIELD

This invention relates to top water lures, such as buzz baits and top water plugs, having one or more propellers disposed thereon for creating noise, splashing water and a wake of bubbles.

BACKGROUND ART

In FIG. 1, a fishing lure 9 commonly referred to as a "buzz bait" or "buzzer" of a conventional, "safety pin" design, has a shaft 10 with a rearward portion formed into a fish hook 11, a medial portion formed into an eye 12 for attaching a fish line to draw the lure through the water, and a bridge portion 13 upon which a propeller 14 is disposed to rotate, the rearward tip 15 of the shaft being bent so as to retain the propeller 14 thereon. A rivet bearing 17 acts as a thrust bearing as the propeller 14 is driven rearwardly on the bridge portion 13 when the lure is drawn through the water to the right as seen in FIG. 1. The shaft may have a kink 19 in it so as to place a weight 21 disposed thereon below the line of motive force, through the eyelet 12, thereby to provide vertical stability to the lure as it is being drawn through the water. In operation, the blades 22 of the propeller 14 sling water, create a thumping sound, and sling water, as the lure 9 is drawn by the fish line. Not shown in FIG. 1 are skirts, which may comprise a rubber skirt trailing the lure so as to resemble a wounded frog, or a thread skirt fastened at the weight 21 so as to resemble a wounded fish. When the lure 9 is drawn through the water, the action of the blades 22 tends to make it ride up with a portion of the propeller 14 out of the water, so that the blades make a thumping noise which is believed to attract the fish. The rubbing of the propeller 14 and/or the rivet bearing 17 may also cause a squeak which is also though to attract fish.

While this lure has been successful, it has several drawbacks. First and foremost, since the principal portion of the propeller 14 is in a plane parallel with the bridge portion 13, the propeller itself impedes its own rotation by interfering with the water as it attempts to rotate as a consequence of interaction between the blades 22 and the water. The propeller 14 thus accelerates slowly and has a relatively low ratio of rotary speed to speed of translation through the water as it is being towed by the fish line. Additionally, the amount of activity which can be created with short pulls on the line is very limited. Since there is a significant amount of space between one blade 22 and the other blade 22, the propeller 14 becomes entangled in weeds quite easily. Because the propeller 14 is essentially a broad, flat piece, when it comes in contact with an underwater obstruction, it tends to be stopped by such contact, and then, when stopped, tends to drop in the water.

In FIG. 2, a top water plug 24 includes a tapered body 25 having flat, two-blade propellers 26, 27 captured by eyelets 28, 29 at the aft and fore end thereof. The eyelet 28 typically holds a triple hook, while the eyelet 29 is attached to the fish line for drawing the plug 24 through the water. On the belly of the plug 24, an additional pair of eyelets 30 may typically hold additional triple hooks. The propellers 26, 27 are typically two-dimensional (having no significant pitch), and do not churn the water or provide bubbles to any great extent. In fact, to provide the tiniest of wakes, it is necessary to provide a rip (rapid pull) of at least one foot, at unnaturally high speed, thereby defeating the purpose of simulating a wounded fish, which would not travel fast.

DISCLOSURE OF INVENTION

Objects of the invention include provision of a top water lure having a propeller which provides a strong bubble wake with only a few inches of motion; which provides a strong bubble wake while being towed at extremely slow speeds; which is less prone to be entangled in weeds within the water; which will "walk", like a wheel, over an obstruction, rather than being stopped by the obstruction, and thereby be less likely to drop in the water as a result of contacting an obstruction in the water; which provides more bubbles and slings more water above the water line than lures available in the prior art in which the blade continues to turn when being reeled very slowly; which is tunable so as to alter the noise and churning produced by the blades; which is more stable with smaller weights but can support larger weights; which is easily adjusted so as to cause a clacking noise between a portion of the shank and the blades; and which provides a much greater range of noise, bubble and water responses than heretofore attainable.

This invention is predicated on the discovery that the propeller of a top water lure should have little or no surfaces parallel with the axis of rotation thereof which impede the rotation of the propeller, while at the same time, the propeller should have significant blade curvature to both sling water above the water line and provide active flotation to position the lure with the preponderance of the propeller above the water line when being towed.

According to the present invention, a propeller for a top water lure having a hub defining an axis of rotation, the principal plane of said propeller being perpendicular to said axis, has a plurality of blades extending from said hub, each blade including a proximal portion adjacent said hub having a first degree of pitch, and a distal tip of said blade having a second degree of pitch substantially different than said first degree of pitch, so that a lure employing the propeller of the present invention rides higher in the water, creates more bubbles, making a big wake, is less susceptible to being entangled by weeds or other underwater growth or stopped by obstructions, slings water high above the water line, has good rotation even when the lure is moving very slowly in the water, and is easily adjusted so as to provide a variation in the sound, the wake and the slinging of water by adjusting the pitch of the proximal portion of the blades, or the rake of the blades, or both. According to the invention, the pitch of the distal portion of each blade may be in the same direction as the pitch of the proximal portion of the blades, but of a greater degree of pitch, or the pitch of the distal portions of the blades may be opposite to the pitch of the proximal portions of the blades. According to the invention, the blades may have single, simple bends therein so that each portion is essentially curvilinear only in two dimensions, or the blades may have curvilinear bends therein to provide blade portions having compound curvilinear surfaces.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a side elevation view of a conventional buzz bait known to the prior art.

FIG. 2 is a side elevation view of a top water plug known to the prior art.

FIG. 3 is a side elevation view of a buzz bait employing a propeller according to the present invention.

FIG. 4 is a front elevation view of a propeller according to the invention.

FIG. 5 is a cross section of a blade taken on the line 5—5 in FIG. 4.

FIG. 6 is a top water plug having propellers of the invention mounted fore and aft.

FIG. 7 is a front elevation view of a preferred embodiment of propeller according to the invention.

FIG. 8 is a partial front elevation view of an alternative blade.

FIG. 9 is a partial, front elevation view of a blade having a compound bend thereby providing a complex surface therein.

FIG. 10 is a side elevation view of a propeller in which the distal ends of the blades have pitch that is opposite to that of the proximal ends of the blades.

FIG. 11 is a partial front elevation view of a blade with holes in it.

FIG. 12 is a side elevation view of a propeller having blades with curvilinear pitch.

FIG. 13 is a side elevation view of one blade, the distal portion of which has less pitch than the proximal portion.

FIGS. 14–17 are related side elevation, top plan, and front elevation views of a blade having 0° pitch;, 15° pitch; 40° pitch; and 40° pitch of a proximal portion with 15° pitch of a distal portion, respectively.

MODE(S) FOR CARRYING OUT THE INVENTION

Figure 16A:
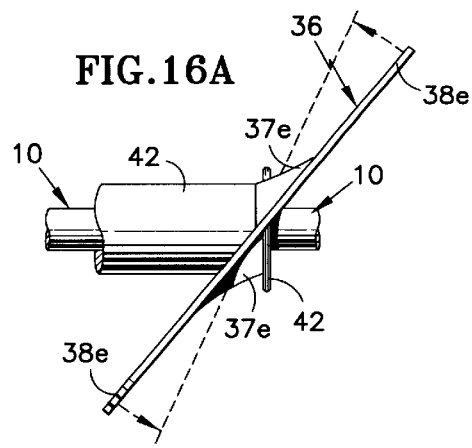

Referring to FIGS. 3–5, a propeller 33 has a central hole 34 which defines its axis of rotation, the material 35 between the hole 34 and each of the individual blades 36 comprises a hub. Each of the blades 36 has a first portion 37 proximal to the hub 35 which has a first degree of pitch and a distal portion 38 having a degree of pitch which is greater than the degree of pitch of the proximal portion 37. The pitch in each blade is in the same direction as the pitch of each other blade, but it need not be the same degree of pitch from one blade to the next. In the propeller illustrated in FIGS. 3 and 4, the pitch is such as to cause rotation of the blade in the direction shown by the arrow 39. The portions 37, 38 of each blade may include an angle on the order of 120°, although this can vary significantly. A hollow bead 40 is used as a spacer so that the shank 10 does not interfere with the blades 36. However, if there is a relatively low pitch or significant rake in the blades 36, the spacer 40 may not be required.

As seen in FIGS. 3 and 4, the principal, medial plane of the propeller 33 and of each blade 36 is perpendicular to the bridge portion 13 of the shaft 10, about which the propeller rotates, but the blades may have significant rake. Although it is not fully understood, it is believed that the pitch of the distal portions 38 tend to provide additional lift to the buzz bait so that the bridge portion 13 rides high out of water, thereby creating a large wake of bubbles, as well as permitting a large amount of water to be flung above the water line, thereby making the lure more conspicuous and very highly visible to fish.

In FIG. 3, the propeller 33 is disposed on a bearing collar 42; the propeller 33 may be press fit or shrink fit onto the bearing collar 42, and/or it may be bonded thereto, metallurgically, with epoxy or adhesive, or in any other suitable way, including somewhat flexible mountings. The propeller 33 is shown disposed at the front end of the bearing collar, but it may be disposed at any place along the bearing collar 42, as may be desired in any particular implementation of the present invention. While it is not fully understood, it is believed that use of a bearing collar which is firmly attached to the propeller improves performance of the lure by preventing the propeller 33 from wobbling at different angles as a consequence of the difference in forces applied thereto in the water versus above the water. Each of the portions 37, 38 may be flat, or may have some curvature, as desired. In FIG. 3, the propeller 33 of the invention is shown mounted on a bridge 13; it may also be mounted in line, that is, somewhere along the shaft near the point 44, in a lure which does not have a vertical portion 47 leading to the bridge 13. The end 43 of the shank 10 may be bent, to the right as shown in FIG. 3, to make a clacking noise from being hit by the blades 36, if desired.

The invention may also be used on top water plugs as illustrated by the plug 48 in FIG. 6. In that embodiment, the propellers 33 will assist in maintaining the plug at the water line, as well as making a strong wake with a lot of sound and water spewing above the water line. The plug 48 may have only one propeller, if desired.

As used herein, the term "pitch" with respect to the blades 36 refers to the extent to which one edge of a portion of the blade is forward of the opposite edge of that portion of the blade, whereas "rake" refers to the degree to which the tip of the blade is fore or aft of the hub of the blade (the degree of coneness).

To provide pitch without any rake, a blade initially in the medial plane of a propeller would be twisted at its root so as to rotate what becomes a leading edge toward the front of the propeller, and to rotate what becomes the trailing edge toward the rear of the propeller, such rotation being about a line within the medial plane (normal to the propeller axis). The amount of rotation about such line can be measured, in degrees, with a protractor.

To add rake to the blade, the blade is twisted at its base to rotate the distal edge or tip of the blade toward the rear of the propeller, or toward the front of the propeller, such rotation being about a line within the medial plane of the propeller which is normal to the line referred to above.

A preferred embodiment of the propeller 33a is illustrated in FIG. 7 to have a plurality of substantially round cutouts 50 at the apex of the joinder of the leading edge 51 of each blade with the trailing edge 52 of the adjacent blade. The cutouts 50 are at the intersection of each of the blades 36 with the hub 35. The cutouts 50 allow bending of the blades 36, both in pitch and in rake, so as to alter the activity provided by the lure. For instance, a change in blade pitch or rake of the blades will alter the tone, timbre or pitch of the sound produced by the propeller 33 as the lure is towed through the water; increased blade pitch may provide greater activity when the lure is pulled intermittently in stop-and-go action.

Lures employing the present invention may be utilized with or without a weight 21 and with or without a skirt 46, which may be conventional, and which is broken away in FIG. 3 for clarity. The fish hook 11 may be a single hook as shown, or a multiple hook, or a plurality of hooks as desired. The hook 11 may be interconnected with the shaft 10 rigidly with respect to the shaft 10 as shown, or it may be interconnected with the shaft 10 flexibly or by means of a swivel. The propeller 33 may be mounted on any shaft, with one or more hooks disposed to the shaft either rigidly or flexibly, to form a lure of the invention.

The exact shape of the blades may vary from that shown hereinbefore without departing from the invention. For instance, a blade 36a shown in FIG. 8 has a bend 50a therein, to define the proximal portion 37a and the distal portion 38a, which is more lateral than the bend shown in FIGS. 3 and 7. The blade 36b in FIG. 9 has a bend 50b which is a curve, thereby defining a distal portion 38b which is curvilinear in three dimensions, which may also be true of the proximal portion 37b. In FIG. 10, a propeller 33c has blades 36c in which the proximal portion 37c has pitch in one direction and the distal portion 38c has pitch in the direction opposite to that of the proximal portion 37c. This propeller is slightly less active than that described with respect to FIGS. 3 and 4 hereinbefore, and may be used to simulate a less frantic bait fish, frog, or the like. FIG. 10 also illustrates that the bearing collar 42b may be disposed with its flange 60 to the rear, rather than to the front as seen in FIG. 3, and in fact may provide a greater squeaking noise since there is more surface contact rubbing between the flange 60 and the rivet bearing 17 (FIG. 3). FIG. 11 illustrates that one or more blades 36d may have one or more holes in the proximal portion 37d, in a distal portion 38d, or both. The number, size and positioning of holes in a blade may vary in any case. Furthermore, holes may be provided in less than all of the blades in a propeller, and may be provided in the proximal portion 37d in some blades and the distal portion 38d in other blades.

In one form of the invention, the blades are not in two distinct portions, but rather each comprises a single, smoothly continuous, curvilinear surface, as illustrated by the blades 36e in FIG. 12. The blades may be curvilinear in two dimensions, as a combination of FIGS. 9 and 12, not shown for clarity.

FIG. 13 illustrates a single blade (for simplicity) which may be joined with similar blades so as to form a propeller 33 as described hereinbefore. The blade 36e has a distal portion 38e, the pitch of which (on the order of 15°) is less than the pitch of the proximal portion 37e (which may be about 40°).

Figure 16C:
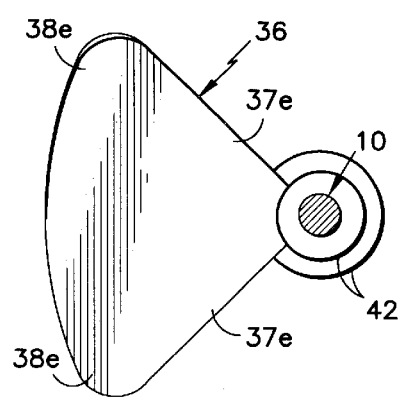
Figure 16B:
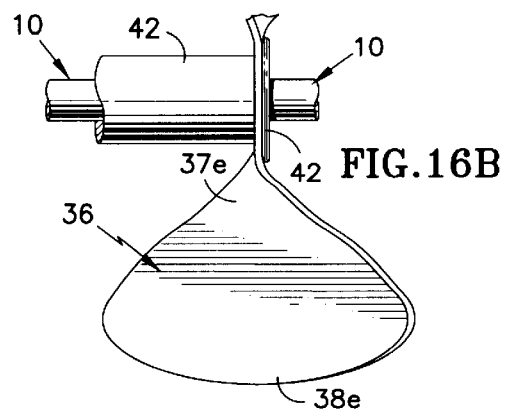
Figure 17A:
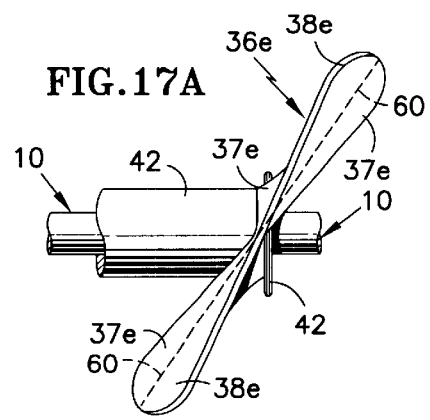
Figure 17C:
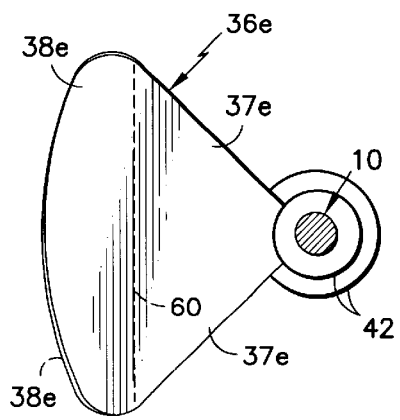
Figure 17B:
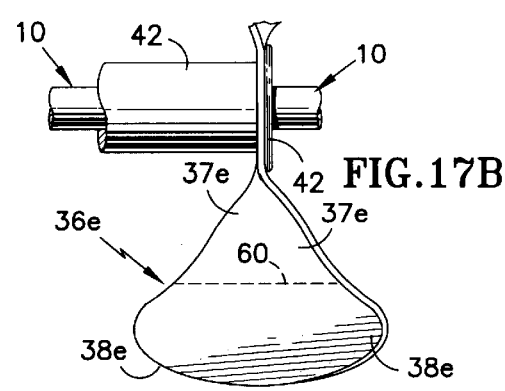

For clarity in understanding of the nature of the blade of FIG. 13, having less pitch at its distal portion 37e than it does at the proximal portion 38e, blades with 0°, 15°, 40° and both 15° and 40°, are illustrated in FIGS. 14–17. Referring to FIG. 14A, a side elevation of a blade having 0° of pitch is shown; all that is seen in FIG. 14A is a side edge. In the top plan view of the blade in FIG. 14B, all that is seen is the top edge. The shape of the blade, before being formed, is illustrated in FIG. 14C. In FIGS. 15A, B and C, the blade 36 is shown with about 15° of pitch. As seen in FIGS. 15A and 15B, an edge 56 of the mid portion of the blade 36 is forward (to the right) of an edge 57 of the mid portion of the blade; one edge being forward of the other, which is the definition of pitch, herein. In FIGS. 16A, B and C, the blade 36 is shown with about 40° of pitch. Dotted lines have been provided in FIG. 16A to indicate the amount by which the distal portion 38e of the blade 36 must be adjusted in order to provide it with a pitch of about 15°, as further indicated by the dotted arrows. In FIGS. 17A, B and C, the distal portion 38e has been adjusted to a pitch of about 15° while the proximal portion 37e remains at a pitch of about 40°. Dash lines 60 have been provided in FIGS. 17A, B and C to assist in demarcating between the proximal portion 37e and the distal portion 38e of the blade 36e. The blade of FIG. 17A differs somewhat from the blade of FIG. 13 in that FIG. 13 illustrates a blade which apparently has a small amount of rake, which is irrelevant to the present invention, as well as the two differing degrees of pitch which are essential to the present invention. The blade of FIG. 17 differs from other blades shown herein in that the other blades have greater pitch in the distal portion than in the proximal portion. FIGS. 14–17 do not represent an actual blade nor do they represent a method of producing such a blade, but are simply offered as clarifying how a two-pitch blade gets to have the appearance that it has.

The disclosure herein is exemplary and represents the best mode currently contemplated for the invention. However, the details of the invention can be varied in a variety of ways including the size, shape and nature of the bearing collar, the rivet bearing, the bead, and other portions of any lure. Two propellers of the invention may be used on buzz baits having two bridges, and two or more may be used on any suitable lure. The propellers of the invention may be made of any suitable, lightweight, sufficiently strong material. Aluminum or plastic, as well as carbon fiber may be utilized. The size of the propeller is irrelevant to the invention, propellers between one and three inches in diameter are common, but other sizes may be used. The hubs of the blades may themselves be shaped so as to provide a bearing surface, or in any other way without departing from the invention. If desired, the shaft may be provided with a pair of flanges to entrain a rotating blade, rather than utilizing a bearing collar. In order to achieve different sounds, the blades might be somewhat flexible if desired.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A fishing lure comprising:
   at least one shaft;
   at least one fish hook interconnected with said shaft; and
   at least one propeller disposed for rotation about said shaft, said at least one propeller comprised of a plurality of blades disposed so that said at least one propeller has a principal medial plane perpendicular to said shaft, each of said blades including (1) a proximal portion adjacent to said shaft and having a first finite degree of pitch, and (2) a distal portion distal of said shaft and having a second finite degree of pitch which is different than said first degree of pitch.

2. A lure according to claim 1 configured as a buzz bait.

3. A lure according to claim 1 wherein said shaft comprises a bridge portion of a safety pin buzz bait.

4. A lure according to claim 1 wherein said shaft is part of a top water plug.

5. A lure according to claim 4 including two propellers disposed for rotation on said plug.

6. A lure according to claim 1 wherein said at least one propeller has a plurality of generally round cutouts, each cutout being disposed adjacent said shaft at a point where the leading edge of one blade meets the trailing edge of a blade adjacent to said one blade.

7. A lure according to claim 1 further comprising a weight disposed on said lure.

8. A lure according to claim 1 further comprising a skirt disposed on said lure.

9. A lure according to claim 1 wherein said at least one propeller is disposed for rotation about said shaft by means of a bearing collar attached to said propeller, said shaft extending through said bearing collar.

10. A lure according to claim 9 wherein said at least one propeller has five blades.

11. A lure according to claim 1 wherein said at least one propeller has between three and seven blades.

12. A lure according to claim 1 wherein said at least one propeller comprises a plurality of propellers.

13. A lure according to claim 12 comprising a plurality of shafts, one for each of said propellers.

14. A lure according to claim 1 wherein the second degree of pitch of said distal portion is less than the first degree of pitch of said proximal portion.

15. A lure according to claim 1 wherein the second degre of pitch of said distal portion is greater than the first degree of pitch of said proximal portion.

16. A lure according to claim 1 wherein said distal portion and said proximal portion are curvilinear and formed by a single, smoothly continuous curvilinear surface.

17. A lure according to claim 1 wherein the second degree of pitch of said distal portion is in the same direction as the first degree of pitch of said proximal portion.

18. A lure according to claim 1 wherein the second degree of pitch of said distal portion is of a direction which is opposite to the direction of the first degree of pitch of said proximal portion.

* * * * *